United States Patent
Furuta

(10) Patent No.: US 11,762,593 B2
(45) Date of Patent: Sep. 19, 2023

(54) SYSTEM AND METHOD FOR UPDATING FIRMWARE OF NON-VOLATILE STORAGE DEVICES

(71) Applicant: Kioxia Corporation, Tokyo (JP)

(72) Inventor: Takashi Furuta, Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 16 days.

(21) Appl. No.: 17/466,344

(22) Filed: Sep. 3, 2021

(65) Prior Publication Data

US 2022/0300206 A1 Sep. 22, 2022

(30) Foreign Application Priority Data

Mar. 19, 2021 (JP) .................................. 2021-045787

(51) Int. Cl.
G06F 3/06 (2006.01)

(52) U.S. Cl.
CPC .......... *G06F 3/0659* (2013.01); *G06F 3/0604* (2013.01); *G06F 3/0653* (2013.01); *G06F 3/0683* (2013.01)

(58) Field of Classification Search
CPC ............... G06F 3/06559; G06F 3/0604; G06F 3/06553; G06F 3/0683; G06F 3/123; G06F 3/1225; G06F 3/0659; G06F 3/0653; G06F 3/061; G06F 3/0629; G06F 3/0688

See application file for complete search history.

(56) References Cited

U.S. PATENT DOCUMENTS

| | | | |
|---|---|---|---|
| 5,930,823 A | 7/1999 | Ito et al. | |
| 8,375,385 B1* | 2/2013 | Harel | ...................... G06F 8/654 717/173 |
| 10,409,519 B2* | 9/2019 | Kiyota | .................... G06F 3/061 |
| 2003/0177239 A1 | 9/2003 | Shinohara et al. | |
| 2009/0083765 A1 | 3/2009 | Davis et al. | |
| 2014/0089912 A1* | 3/2014 | Wang | ........................ G06F 8/65 717/173 |
| 2016/0170841 A1* | 6/2016 | Yarnell | ............... G06F 11/1469 714/19 |

FOREIGN PATENT DOCUMENTS

| | | |
|---|---|---|
| JP | 2830857 | 9/1998 |
| JP | 2003-271429 A | 9/2003 |
| JP | 5216093 | 3/2013 |

OTHER PUBLICATIONS

Kmail Anwar "How to Deploy Updates on Multiple Computers at the same time", May 16, 2020 (Year: 2020).*

* cited by examiner

*Primary Examiner* — Khoa D Doan
(74) *Attorney, Agent, or Firm* — Foley & Lardner LLP

(57) ABSTRACT

According to one embodiment, an information processing device includes a processor. The processor receives a signal for requesting each of a plurality of storage devices to execute a first process. Based on the received signal, the processor transmits a first command, corresponding to the first process, to each of the plurality of storage devices using a plurality of identifiers relating to the plurality of storage devices, respectively.

15 Claims, 11 Drawing Sheets

FIG. 4

| STORAGE ID | INCOMPLETE/COMPLETED |
|---|---|
| s1 | INCOMPLETE |
| s2 | INCOMPLETE |
| ⋮ | ⋮ |
| sn | INCOMPLETE |

FIG. 6

| STORAGE ID | INCOMPLETE/COMPLETED |
|---|---|
| s1 | COMPLETED |
| s2 | INCOMPLETE |
| ⋮ | ⋮ |
| sn | INCOMPLETE |

SYSTEM AND METHOD FOR UPDATING FIRMWARE OF NON-VOLATILE STORAGE DEVICES

CROSS-REFERENCE TO RELATED APPLICATION

This application is based upon and claims the benefit of priority from Japanese Patent Application No. 2021-045787, filed Mar. 19, 2021, the entire contents of which are incorporated herein by reference.

FIELD

Embodiments described herein relate generally to a technique for controlling a storage device including a nonvolatile memory.

BACKGROUND

In recent years, storage devices that include a nonvolatile memory as a storage have become widespread. A solid state drive (SSD) is known as one of such storage devices. The SSD includes a NAND flash memory.

A storage device includes, for example, an interface conforming to NVM Express (NVMe) (registered trademark). NVMe defines a command that causes a storage device to perform a specific process. The specific process is, for example, a process of providing a log or a process of downloading a firmware (FW). Therefore, the storage device has, for example, a function of providing a log based on a command and a function of downloading an FW based on a command.

In a data center, one information processing device may manage a plurality of storage devices (for example, dozens of storage devices). A user (that is, an administrator) who uses an information processing device needs to manually perform an operation with respect to each of the plurality of storage devices when the user wants each of the plurality of storage devices to perform a specific process. In other words, in order to cause all of the plurality of storage devices to perform a specific process, the administrator needs to perform the operation a number of times corresponding to the number of the plurality of storage devices.

DESCRIPTION OF THE DRAWINGS

FIG. 4 is a diagram showing an example of a configuration of a storage management table used in the information processing device according to the first embodiment of the present disclosure.

FIG. 6 is a diagram showing an example of an updated storage management table in the information processing device according to the first embodiment of the present disclosure.

DETAILED DESCRIPTION

Embodiments provide an information processing device capable of efficiently managing a plurality of storage devices, a control method of the information processing device, and an information processing system.

In general, according to one embodiment, an information processing device includes a processor. The processor receives a signal for requesting each of a plurality of storage devices to execute a first process. Based on the received signal, the processor transmits a first command, corresponding to the first process, to each of the plurality of storage devices using a plurality of identifiers relating to the plurality of storage devices, respectively.

Hereinafter, embodiments will be described with reference to the drawings.

Figure 1:
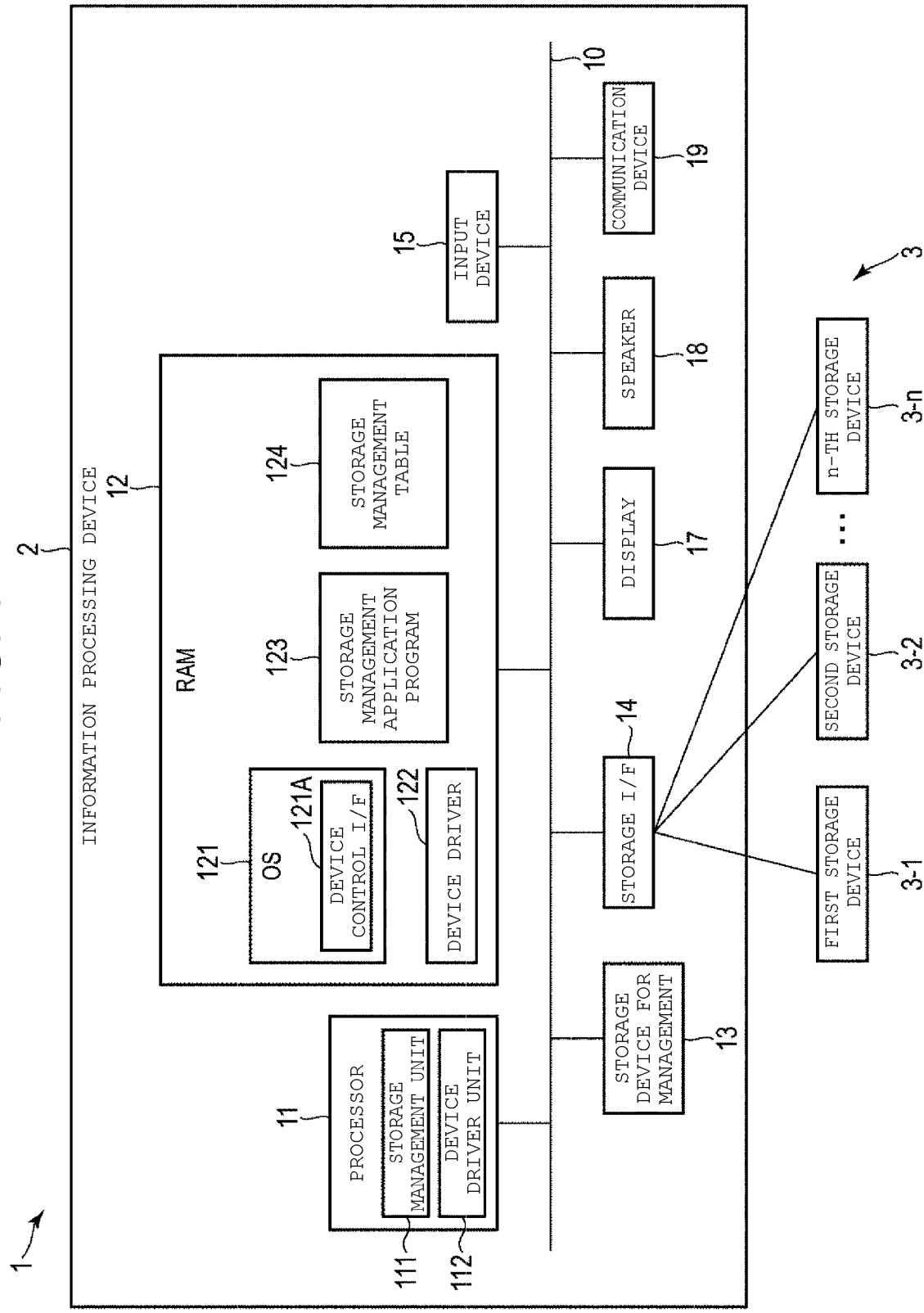
FIG. 1 is a block diagram showing an example of a configuration of an information processing system that includes an information processing device according to a first embodiment of the present disclosure.

FIG. 1 is a block diagram showing an example of a configuration of an information processing system 1 that includes an information processing device according to a first embodiment of the present disclosure. The information processing system 1 includes an information processing device 2 and a plurality of storage devices 3.

The information processing device 2 is, for example, a server computer. In the following, a user who uses the information processing device 2 will be referred to as an administrator. The administrator may directly operate the information processing device 2. Alternatively, the administrator may remotely operate the information processing device 2 by using an external information processing terminal. The information processing terminal is, for example, a personal computer, a tablet computer, or a smart phone.

The plurality of storage devices 3 are, for example, n storage devices 3-1, 3-2, . . . , 3-n. In the following, one of the plurality of storage devices 3 may be referred to as a storage device 3. The storage device 3 is, for example, a solid state drive (SSD). Further, the storage device 3 may be, for example, a hard disk drive (HDD). The storage device 3 functions as a storage device of the information processing device 2. The storage device 3 is configured to write data to a memory device. The storage device 3 is configured to read data from a memory device. The memory device is, for example, a nonvolatile memory. The nonvolatile memory is, for example, a NAND flash memory.

The storage device 3 and the information processing device 2 are connected, for example, by inserting the storage device 3 into a slot provided in the information processing device 2. The storage device 3 and the information processing device 2 may be connected via a cable or a network. Alternatively, the storage device 3 may be built in the information processing device 2. As an interface for connecting the storage device 3 and the information processing device 2, SCSI, Serial Attached SCSI (SAS), ATA, Serial ATA (SATA), PCI Express (PCIe) (registered trademark), Ethernet (registered trademark), Fibre channel, NVM Express (NVMe) (registered trademark), or the like may be used.

Next, an internal configuration of the information processing device 2 will be described. The information processing device 2 includes, for example, at least one processor 11, a random access memory (RAM) 12, a storage device 13 for management, a storage interface (storage I/F) 14, an input device 15, a display 17, a speaker 18, and a communication device 19. The processor 11, the RAM 12, the storage device 13 for management, the storage I/F 14, the input device 15, the display 17, the speaker 18, and the communication device 19 may be connected via a bus 10.

The processor 11 is, for example, a CPU. The processor controls an operation of various components in the information processing device 2.

The RAM 12 is a volatile memory. The RAM 12 is, for example, a dynamic random access memory (DRAM). The storage area of the RAM 12 is allocated, for example, as a storage area for data (for example, a storage management table 124) used for processing by the operating system (OS) 121, the device driver 122, an application program (for example, a storage management application program 123), and the processor 11.

The storage device 13 for management is, for example, an SSD. The storage device 13 for management stores a program and data for controlling the operation of the information processing device 2.

The storage I/F 14 is a hardware interface for performing communication between the information processing device 2 and the outside. The storage I/F 14 performs communication between the information processing device 2 and each of the plurality of storage devices 3, for example. Examples of the command to be transmitted to the outside include a write command, a read command, a log acquisition command, an FW download command, and an FW commit command.

The input device 15 is, for example, a keyboard, a mouse, a touch pad, and a touch panel. The input device 15 can transmit a signal, that corresponds to the operation by the administrator, to each unit in the information processing device 2.

The display 17 is an output device. The display 17 includes a screen. The display 17 displays, for example, an image that is based on a display signal generated by the processor 11, on the screen.

The speaker 18 is an output device. The speaker 18 outputs, for example, a voice that is based on a voice signal generated by the processor 11.

The communication device 19 is a device configured to execute wired communication or wireless communication between the information processing device 2 and the outside. When the administrator uses an external information processing terminal, the communication device 19 executes communication between the information processing device 2 and the information processing terminal. The communication device 19 can receive a signal in accordance with an operation by the administrator on the information processing terminal. Further, the communication device 19 can transmit a display signal to the information processing terminal for displaying the display signal on the information processing terminal. The communication device 19 can transmit a voice signal to the information processing terminal for outputting the voice on the information processing terminal. The communication device 19 includes a transmission unit and a reception unit. The transmission unit transmits a signal. The reception unit receives a signal.

Next, a program executed by the processor 11 will be described.

The processor 11 executes various programs loaded into the RAM 12 from the storage device 13 for management. The program executed by the processor 11 includes the OS 121, the device driver 122, and the storage management application program 123. In the following, the storage management application program 123 is also referred to as a storage management application 123.

The OS 121 is a program for controlling the basic operations of various components in the information processing device 2. The processor 11 executing the OS 121 controls, for example, the input/output, file management, memory management, and communication.

The device driver 122 is a program for controlling a device connected to the information processing device 2. The processor 11 executing the device driver 122, transmits a command or data to the storage device 3 via the storage I/F 14. The processor 11 executing the device driver 122, receives a response or data with respect to a command from the storage device 3 via the storage I/F 14. In the following, a functional configuration, which is provided in the processor 11 by executing the device driver 122, is referred to as a device driver unit 112.

The storage management application 123 is a program for collectively managing the plurality of storage devices 3. The processor 11 executing the storage management application 123 receives a signal that corresponds to the operation by the administrator from the input device 15. The operation by the administrator is, for example, an operation for requesting each of the plurality of storage devices 3 to execute a specific process. Therefore, the received signal can be said to be a signal for requesting each of the plurality of storage devices 3 to execute a specific process. The specific process is, for example, a process of providing a log to the information processing device 2 (hereinafter, referred to as a log provision process). That is, the operation by the administrator is, for example, an operation for requesting each of the plurality of storage devices 3 to execute the log provision process. In the following, the operation for requesting each of the plurality of storage devices 3 to execute the log provision process is also referred to as a log provision request operation. The log provision request operation is an operation for requesting all the storage devices 3 to execute the log provision process instead of any storage device 3 connected to the information processing device 2. Therefore, the administrator does not need to designate the storage device 3, which is a target for executing the log provision process, in the log provision request operation. The storage management application 123 has a function of causing each of the plurality of storage devices 3 to execute a process corresponding to an operation by the administrator. More specifically, the storage management application 123 has, for example, a function of causing each of the plurality of storage devices 3 to execute the log provision process based on a signal of the input device 15 that corresponds to the log provision request operation. The provided log is used, for example, for quality diagnosis of the storage device 3. In the following, the functional configuration, which is provided in the processor 11 by executing the storage management application 123, is referred to as a storage management unit 111.

The OS 121 includes a device control interface (device control I/F) 121A. The device control I/F 121A is a software interface for communication between a program on a user land and a program on a kernel land. The program on the user land is a program that can be executed with the authority of a general user. The program on the kernel land is a program that cannot be executed with the authority of a general user. For example, the device control I/F 121A in Windows (registered trademark) is the DeviceIoControl. Further, the device control I/F 121A in Linux (registered trademark) is the ioctl. More specifically, the device control I/F 121A performs communication between the storage management application 123 and the device driver 122, for example. The storage management application 123 is a program on the user land. The device driver 122 is a program on the kernel land.

The device control I/F 121A uses a command or an Application Programming Interface (API) function. More specifically, the ioctl in Linux uses a command. Further, the DeviceIoControl in Windows uses an API function. A command or a function used by the device control I/F 121A corresponds to, for example, a command that is issued by the device driver unit 112 with respect to a device. The device is, for example, a storage device 3. The command issued by the device driver unit 112 is, for example, a command defined in the NVMe standard. The command or the function used by the device control I/F 121A can be executed by designating a target device or a parameter.

The storage management unit 111, the device control I/F 121A, and the device driver unit 112 operate in cooperation with each other when a signal that corresponds to the operation by the administrator is received from the input device 15. More specifically, when the storage management unit 111 receives a signal that corresponds to the operation by the administrator from the input device 15, the storage management unit 111 executes the command or the function of the device control I/F 121A corresponding to the signal. The storage management unit 111 may execute the command or the function by designating a target device or a parameter. As a result, the storage management unit 111 can request that a command corresponding to the operation by the administrator be issued from the device driver unit 112. The device driver unit 112 issues a corresponding command based on the executed command or function of the device control I/F 121A. Thereafter, the device driver unit 112 transmits the issued command to the device. As a result, the device driver unit 112 causes the device to execute the process that corresponds to the transmitted command. Therefore, the cooperative operation of the storage management unit 111, the device control I/F 121A, and the device driver unit 112 enables the device to execute the process corresponding to the operation by the administrator.

The information processing device 2 according to the first embodiment of the present disclosure operates so as to cause all of the plurality of storage devices 3 to execute the process corresponding to the operation based on the signal corresponding to the one time operation by the administrator. More specifically, the information processing device 2 transmits a log acquisition command to each of the plurality of storage devices 3 based on the signal of the input device 15 corresponding to one time log provision request operation by the administrator, for example. The log acquisition command is a command for causing the storage device 3 to provide a log. The log acquisition command is, for example, a Get Log Page command defined in the NVMe standard. Each of the plurality of storage devices 3 executes the log provision process based on the log acquisition command.

The information processing device 2 causes all of the plurality of storage devices 3 to execute a process corresponding to the operation by performing one time operation by the administrator. Therefore, the risk of operation mistakes by the administrator can be reduced. Further, the administrator does not need to perform an operation for acquiring a list of the plurality of storage devices 3. When the administrator does not perform a plurality of operations with respect to each of the plurality of storage devices 3, the waiting time by the administrator does not occur. Therefore, the time required for all of the plurality of storage devices 3 to complete the execution of the process corresponding to the operation can be shortened. Therefore, the information processing device 2 can efficiently manage the plurality of storage devices 3.

Figure 2:
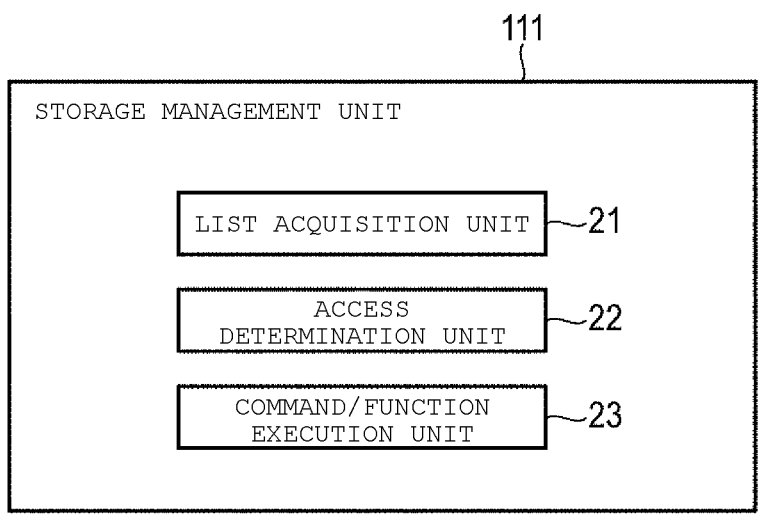
FIG. 2 is a block diagram showing an example of a functional configuration of a storage management unit in the information processing device according to the first embodiment of the present disclosure.

FIG. 2 is a block diagram showing an example of a functional configuration of a storage management unit 111 in the information processing device 2 according to the first embodiment of the present disclosure. The storage management unit 111 includes, for example, a list acquisition unit 21, an access determination unit 22, and a command/function execution unit 23.

The list acquisition unit 21 receives a signal transmitted by the input device 15. The signal corresponds to an operation by the administrator. The operation by the administrator is, for example, a log provision request operation. When the list acquisition unit 21 receives the signal, the list acquisition unit 21 acquires a list of the plurality of storage devices 3 that are connected to the information processing device 2. The list includes, for example, a plurality of identifiers indicating each of the plurality of storage devices 3. The identifier is information capable of specifying one of the plurality of storage devices 3 connected to the information processing device 2. In the following, the identifier of the storage device 3 is also referred to as a storage ID. The list acquisition unit 21 transmits the acquired list to the access determination unit 22. The list acquisition unit 21 may store the acquired list in the RAM 12.

The access determination unit 22 receives the list from the list acquisition unit 21. The access determination unit 22 generates the storage management table 124 by using the received list. The storage management table 124 is a table for managing whether or not the storage device 3 executed the process corresponding to the operation by the administrator. In the following, a process corresponding to the operation by the administrator is referred to as a specific process. The access determination unit 22 can determine whether or not all the storage devices 3 completed the execution of the specific process by using the storage management table 124.

The access determination unit 22 determines one storage device 3 that did not execute the specific process by using the storage management table 124. The access determination unit 22 transmits an instruction, which indicates the determined storage device 3, to the command/function execution unit 23. The access determination unit 22 repeatedly transmits instructions with respect to the command/function execution unit 23 until all the storage devices 3 complete the execution of the specific process. It is noted that the access determination unit 22 can continuously transmit a plurality of instructions each designating the plurality of storage devices 3 to the command/function execution unit 23. Further, the access determination unit 22 may transmit the plurality of instructions each designating the plurality of storage devices 3 to the command/function execution unit 23 in parallel.

The command/function execution unit 23 receives an instruction from the access determination unit 22. The command/function execution unit 23 executes one or more commands or functions of the device control I/F 121A corresponding to the operation by the administrator based on the received instruction. The command/function execution unit 23 designates one storage device 3 that is indicated by the received instruction when the command or the function is executed.

With the configuration shown in FIG. 2 above, the storage management unit 111 designates each of the plurality of storage devices 3 and executes the command or the function of the device control I/F 121A a plurality of times. The storage management unit 111 can designate one of the plurality of storage devices 3 by using the storage management table 124 when the command or the function of the device control I/F 121A is executed.

The device driver unit 112 issues a corresponding command based on the executed command or function of the device control I/F 121A. The issued command corresponds to a specific process to be executed by the storage device 3. Thereafter, the device driver unit 112 transmits the issued command to the designated storage device 3. It is noted that the device driver unit 112 can continuously transmit commands with respect to the plurality of storage devices 3. Further, the device driver unit 112 may transmit the commands with respect to the plurality of storage devices 3 in parallel.

The storage device 3 receives the command transmitted by the device driver unit 112. The storage device 3 executes a specific process based on the received command.

Therefore, the storage management unit 111 and the device driver unit 112 can transmit the command corresponding to the operation by the administrator to each of the plurality of storage devices 3 by using the storage management table 124. As a result, the storage management unit 111 and the device driver unit 112 can cause all the storage devices 3 to execute the specific process.

A case where the operation by the administrator is a log provision request operation will be described with reference to FIGS. 3 to 6.

Figure 3:
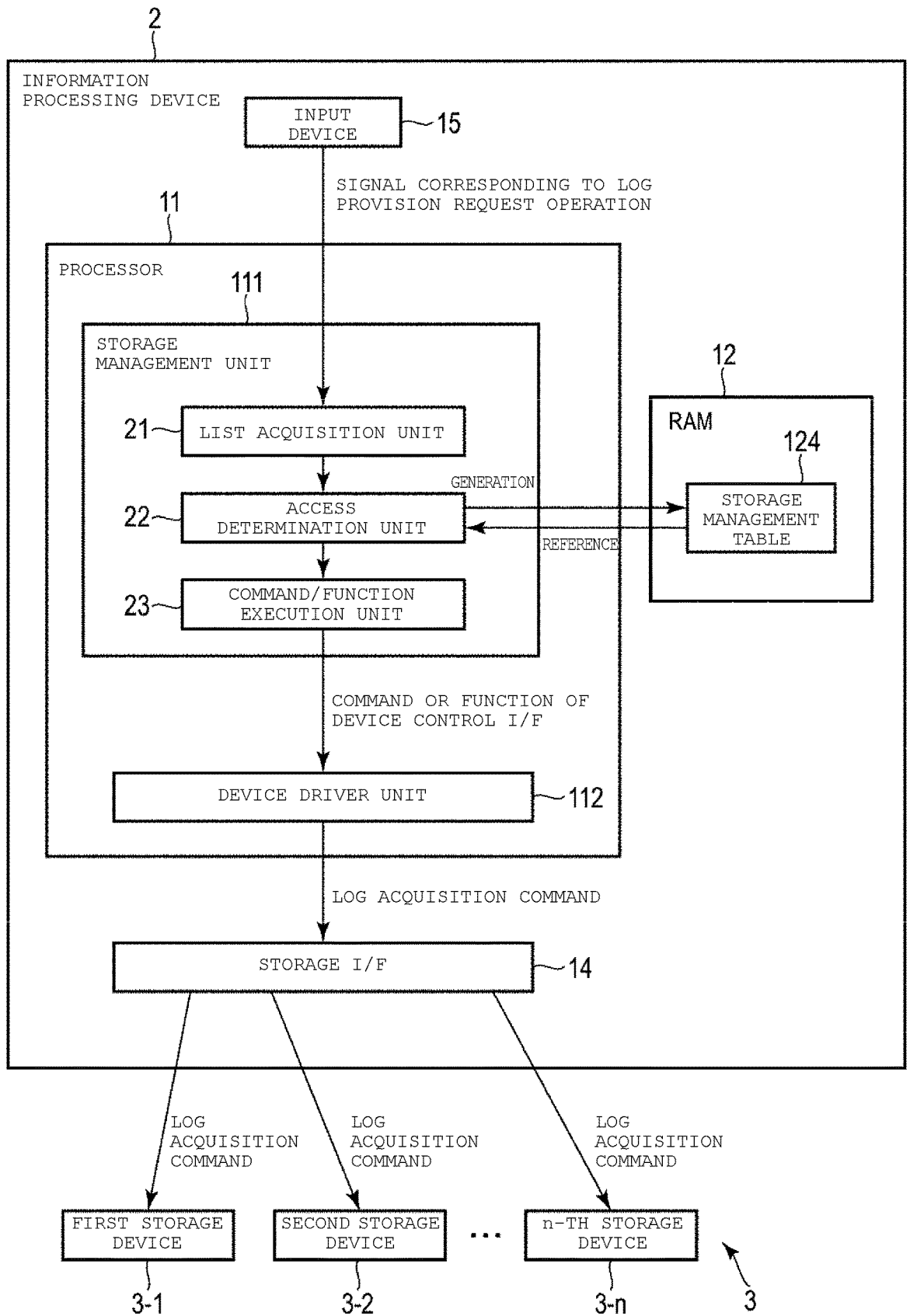
FIG. 3 is a diagram showing an example of a command transmission operation executed in the information processing device according to the first embodiment of the present disclosure.

FIG. 3 is a diagram showing an example of a command transmission operation executed in an information processing device 2 according to the first embodiment of the present disclosure. An operation of the information processing device 2 when the log provision request operation is performed by the administrator will be described below.

The list acquisition unit 21 receives a signal corresponding to the log provision request operation, from the input device 15. The list acquisition unit 21 acquires a list of the plurality of storage devices 3 that are connected to the information processing device 2 based on the received signal. The list acquisition unit 21 transmits the acquired list to the access determination unit 22.

The access determination unit 22 receives the list from the list acquisition unit 21. The access determination unit 22 generates the storage management table 124 by using the list. The storage management table 124 includes information for managing whether or not each of the plurality of storage devices 3 executed the log provision process.

FIG. 4 is a diagram showing an example of a configuration of a storage management table 124 used in the information processing device 2 according to the first embodiment of the present disclosure. The storage management table 124 may include a plurality of entries corresponding to each of the plurality of storage devices 3 that are connected to the information processing device 2. Each entry includes, for example, a storage ID field and an incomplete/completed field.

The storage ID field indicates a storage ID assigned to the corresponding storage device 3.

The incomplete/completed field indicates whether or not the corresponding storage device 3 completed the execution of the specific process (here, it indicates the log provision process). When the corresponding storage device 3 did not complete the execution of the specific process, for example, "incomplete" is set in the incomplete/completed field. When the corresponding storage device 3 completed the execution of the specific process, for example, "completed" is set in the incomplete/completed field.

In the example shown in FIG. 4, the storage management table 124 indicates that the storage device 3 having the storage ID "s1", did not complete the execution of the specific process ("incomplete"). The storage management table 124 indicates that the storage device 3 having the storage ID "s2", did not complete the execution of the specific process. The storage management table 124 indicates that the storage device 3 having the storage ID "sn", did not complete the execution of the specific process.

The process returns to FIG. 3. The access determination unit 22 determines one storage device 3 that did not execute the log provision process by using the generated storage management table 124. Specifically, the access determination unit 22 selects one entry in order from the beginning of the storage management table 124, for example. Thereafter, the access determination unit 22 determines one storage device 3 specified by using the storage ID of the selected entry as one storage device 3 that did not execute the log provision process.

The access determination unit 22 transmits an instruction, which indicates the determined one storage device 3, to the command/function execution unit 23. The access determination unit 22 repeatedly transmits instructions with respect to the command/function execution unit 23 until all the storage devices 3 complete the execution of the log provision process. By using the storage management table 124, the access determination unit 22 can cause all the storage devices 3 to execute the log provision process without omission.

More specifically, for example, the access determination unit 22 transmits an instruction indicating a first storage device 3-1 to the command/function execution unit 23. The access determination unit 22 transmits an instruction indicating a second storage device 3-2 to the command/function execution unit 23. Further, the access determination unit 22 transmits an instruction indicating an n-th storage device 3-n to the command/function execution unit 23.

The command/function execution unit 23 receives an instruction from the access determination unit 22. The command/function execution unit 23 executes the command or the function of the device control I/F 121A corresponding to the log provision request operation, based on the received instruction. The command to be executed is a command for acquiring a log. More specifically, the command to be executed is, for example, the Get Log Page command of the ioctl in Linux. Further, the function to be executed is, for example, a function for acquiring a log. More specifically, the function to be executed is, for example, the API function for log acquisition of the DeviceIoControl in Windows. The command/function execution unit 23 designates one storage device 3 that is indicated by the received instruction when the command or the function of the device control I/F 121A is executed.

More specifically, for example, the command/function execution unit 23 designates the first storage device 3-1 and executes the command or the function of the device control I/F 121A that corresponds to the log provision request operation. The command/function execution unit 23 designates the second storage device 3-2 and executes the command or the function of the device control I/F 121A that corresponds to the log provision request operation. Thereafter, the command/function execution unit 23 designates the n-th storage device 3-n and executes the command or the function of the device control I/F 121A that corresponds to the log provision request operation.

The device driver unit 112 determines a corresponding command based on the executed command or function of the device control I/F 121A. The determined command corresponds to the log provision process to be executed by the storage device 3.

Specifically, the device driver unit 112 determines a log acquisition command as a command to be issued when the Get Log Page command of ioctl is executed. Further, the device driver unit 112 determines a log acquisition command as a command to be issued when the API function for the log acquisition of the DeviceIoControl is executed.

The device driver unit 112 issues the determined log acquisition command. Thereafter, the device driver unit 112 transmits the issued command to the storage device 3 designated by the command/function execution unit 23. The command is transmitted to the storage device 3 via the storage I/F 14.

More specifically, for example, the device driver unit 112 transmits the log acquisition command to the first storage device 3-1. The device driver unit 112 transmits the log acquisition command to the second storage device 3-2. Further, the device driver unit 112 transmits the log acquisition command to the n-th storage device 3-n.

Each of the plurality of storage devices 3 receives the log acquisition command transmitted by the device driver unit 112. That is, the first storage device 3-1 receives the log acquisition command transmitted to the first storage device 3-1. The second storage device 3-2 receives the log acquisition command transmitted to the second storage device 3-2. The n-th storage device 3-n receives the log acquisition command transmitted to the n-th storage device 3-n.

Figure 5:
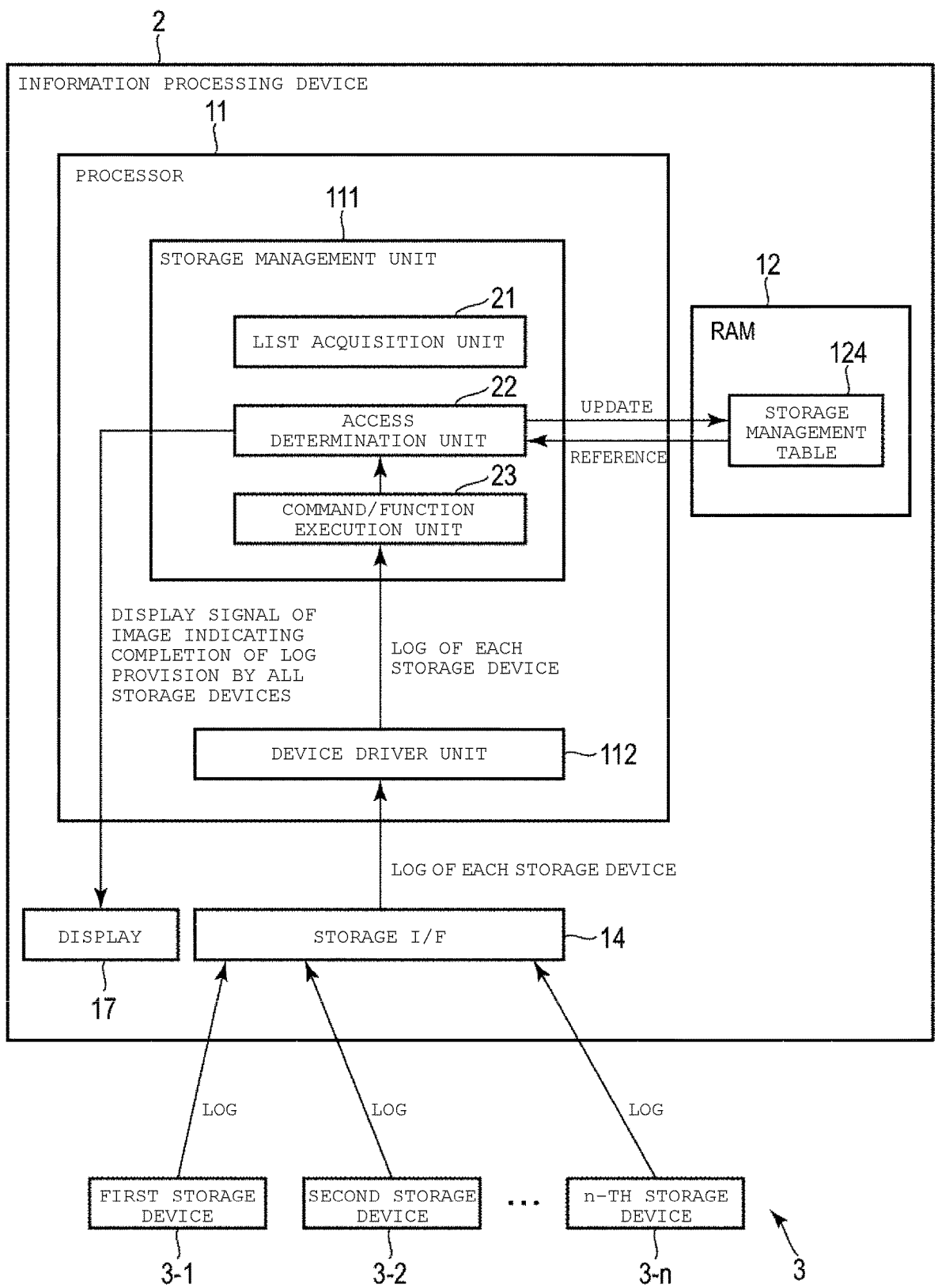
FIG. 5 is a diagram showing an example of a log reception operation executed in the information processing device according to the first embodiment of the present disclosure.

FIG. 5 is a diagram showing an example of a log reception operation executed in the information processing device 2 according to the first embodiment of the present disclosure. The operation of the storage device 3 and the information processing device 2 when a log is provided from the storage device 3 based on the log acquisition command will be described below.

Each of the plurality of storage devices 3 provides a log of the storage device 3 to the information processing device 2 based on the received log acquisition command. That is, the first storage device 3-1 provides a log of the first storage device 3-1 to the information processing device 2. The second storage device 3-2 provides a log of the second storage device 3-2 to the information processing device 2. The n-th storage device 3-n provides a log of the n-th storage device 3-n to the information processing device 2.

The device driver unit 112 receives the log provided by each of the plurality of storage devices 3 via the storage I/F 14. That is, the device driver unit 112 receives the log provided by the first storage device 3-1. The device driver unit 112 receives the log provided by the second storage device 3-2. The device driver unit 112 receives the log provided by the n-th storage device 3-n. The device driver unit 112 transmits the received log for each storage device 3 to the command/function execution unit 23.

The command/function execution unit 23 receives a log of one storage device 3 from the device driver unit 112. The command/function execution unit 23 stores the received log of the storage device 3 in the storage device 13 for management as a file, for example. Further, the command/function execution unit 23 notifies the access determination unit 22 that one storage device 3 provided a log.

The access determination unit 22 updates the storage management table 124 when the command/function execution unit 23 notifies the access determination unit 22 of the fact that one storage device 3 provided a log. Specifically, the access determination unit 22 specifies an entry that corresponds to the storage device 3 that provided a log in the storage management table 124. Thereafter, the access determination unit 22 sets "completed" in the completed/incomplete field of the specified entry.

For example, when the command/function execution unit 23 notifies the access determination unit 22 of the fact that the first storage device 3-1 provided a log, the access determination unit 22 specifies an entry that corresponds to the first storage device 3-1 in the storage management table 124. Thereafter, the access determination unit 22 sets "completed" in the completed/incomplete field of the specified entry. When the command/function execution unit 23 notifies the access determination unit 22 of the fact that the second storage device 3-2 provided a log, the access determination unit 22 specifies an entry that corresponds to the second storage device 3-2 in the storage management table 124. Thereafter, the access determination unit 22 sets "completed" in the completed/incomplete field of the specified entry. Further, when the command/function execution unit 23 notifies the access determination unit 22 of the fact that the n-th storage device 3-n provided a log, the access determination unit 22 specifies an entry that corresponds to the n-th storage device 3-n in the storage management table 124. Thereafter, the access determination unit 22 sets "completed" in the completed/incomplete field of the specified entry.

FIG. 6 shows an example of the updated storage management table 124 in the information processing device 2 according to the first embodiment of the present disclosure. It is assumed that the command/function execution unit 23 notifies the access determination unit 22 of the fact that the first storage device 3-1 provided a log. It is noted that the storage ID of the first storage device 3-1 is defined as "s1".

In this case, as shown in FIG. 6, the access determination unit 22 updates the storage management table 124 so as to indicate that the first storage device 3-1 having the storage ID "s1" provided a log. That is, the access determination unit 22 changes a value set in the incomplete/completed field in the entry including the storage ID "s1" from "incomplete" to "completed".

The process returns to FIG. 5. The access determination unit 22 determines whether or not all the storage devices 3 provided logs by using the updated storage management table 124. The access determination unit 22 determines that all the storage devices 3 provided logs when "completed" is set in the completed/incomplete field in all the entries in the storage management table 124. The access determination unit 22 determines that at least one storage device 3 did not provide a log when "incomplete" is set in the completed/incomplete field in at least one entry in the storage management table 124.

When all the storage devices 3 provided logs, the access determination unit 22 may notify the administrator of the fact that the log provision by all the storage devices 3 is completed. More specifically, the access determination unit 22 transmits, for example, a display signal of an image indicating the completion of the log provision by all the storage devices 3 to the display 17. The display 17 displays the image based on the display signal on the screen. Alternatively, the access determination unit 22 may transmit a voice signal of a voice that indicates the completion of the log provision by all the storage devices 3 to the speaker 18. The speaker 18 outputs the voice based on the voice signal.

When at least one storage device 3 did not provide a log, the access determination unit 22 transmits an instruction that indicates the storage device 3 that did not provide a log to the command/function execution unit 23. Subsequent operations of the command/function execution unit 23, the device driver unit 112, and the storage device 3 are as described above with reference to FIG. 3.

According to the configuration shown in FIGS. 3 to 6 above, the information processing device 2 can cause all the storage devices 3 to provide logs based on the signal of the input device 15 that corresponds to the one time log provision request operation by the administrator. The administrator does not need to perform an operation for requesting the provision of logs a number of times corresponding to the number of the plurality of storage devices 3. Therefore, the risk of operation mistakes by the administrator can be reduced. Further, as compared with the case where the administrator performs the operation a number of times corresponding to the number of the plurality of storage devices 3, the time required for all of the plurality of storage devices 3 to provide logs can be shortened. Therefore, the information processing device 2 can efficiently manage the plurality of storage devices 3.

Figure 7:
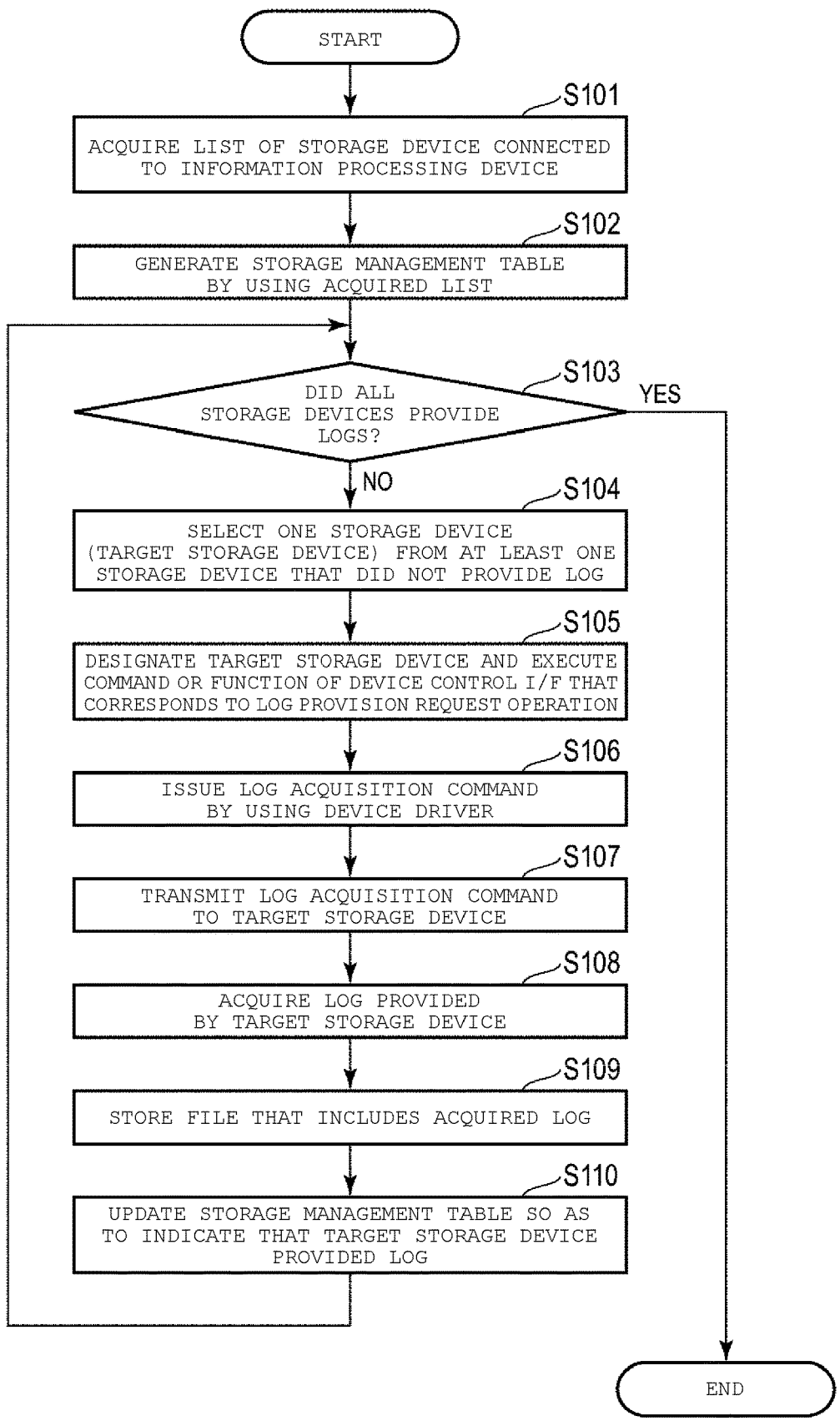
FIG. 7 is a flowchart showing an example of a procedure of a log acquisition process executed by a processor in the information processing device according to the first embodiment of the present disclosure.

FIG. 7 is a flowchart showing an example of a procedure of a log acquisition process executed by the processor 11 in the information processing device 2 according to the first embodiment of the present disclosure. The log acquisition process is a process for acquiring a log from each of the plurality of storage devices 3. In other words, the log acquisition process is a process for causing each of the plurality of storage devices 3 to provide a log. The processor 11 executes the log acquisition process based on the signal corresponding to the log provision request operation by the administrator received from the input device 15.

The processor 11 acquires a list of the plurality of storage devices 3 connected to the information processing device 2 (S101). The acquired list includes, for example, identifiers of each of the plurality of storage devices 3.

The processor 11 generates the storage management table 124 by using the acquired list (S102). The generated storage management table 124 includes a plurality of entries. The plurality of entries correspond to the plurality of storage devices 3 indicated in the list, respectively.

The processor 11 determines whether or not all the storage devices 3 that are connected to the information processing device 2, provided logs by using the storage management table 124 (S103). Specifically, when the storage management table 124 does not include an entry for which "incomplete" is set in the incomplete/completed field, the processor 11 determines that all the storage devices 3 provided logs. When the storage management table 124 includes an entry for which "incomplete" is set in the incomplete/completed field, the processor 11 determines that at least one storage device 3 did not provide a log (that is, the processor 11 determines that there is a storage device 3 that did not provide a log).

When all the storage devices 3 provided logs (YES in S103), the processor 11 ends the log acquisition process (end).

When at least one storage device 3 did not provide a log (NO in S103), the processor 11 selects one storage device 3 from at least one storage device 3 that did not provide a log (S104). The selected one storage device 3 is referred to as a target storage device 3.

The processor 11 designates the target storage device 3 and executes the command or the function of the device control I/F 121A that corresponds to the log provision request operation (S105). Thereafter, the processor 11 issues a log acquisition command of the device driver 122 based on the executed command or the function of the device control I/F 121A (S106). Thereafter, the processor 11 transmits the log acquisition command to the target storage device 3 via the storage I/F 14 (S107).

The target storage device 3 receives the log acquisition command. The target storage device 3 provides the log to the information processing device 2 based on the received log acquisition command.

The processor 11 acquires the log provided by the target storage device 3 (S108). The processor 11 stores a file that includes the acquired log (S109). The processor 11 stores the file in, for example, the storage device 13 for management. Thereafter, the processor 11 updates the storage management table 124 (S110) so as to indicate that the target storage device 3 provided a log, and proceeds to S103. That is, the processor 11 repeats the procedure from S104 to S110 for causing one storage device 3 to provide a log until all the storage devices 3 provide logs.

By the log acquisition process shown in FIG. 7 above, the processor 11 can cause all the storage devices 3 that are connected to the information processing device 2, to provide logs. That is, the processor 11 can acquire logs from all the storage devices 3 that are connected to the information processing device 2. The processor 11 can acquire logs of all the storage devices 3 only by the administrator performing the one time log provision request operation.

Comparative Example

Next, an operation in which an information processing device 2A according to a comparative example causes the storage device 3 to provide a log will be described.

Figure 8:
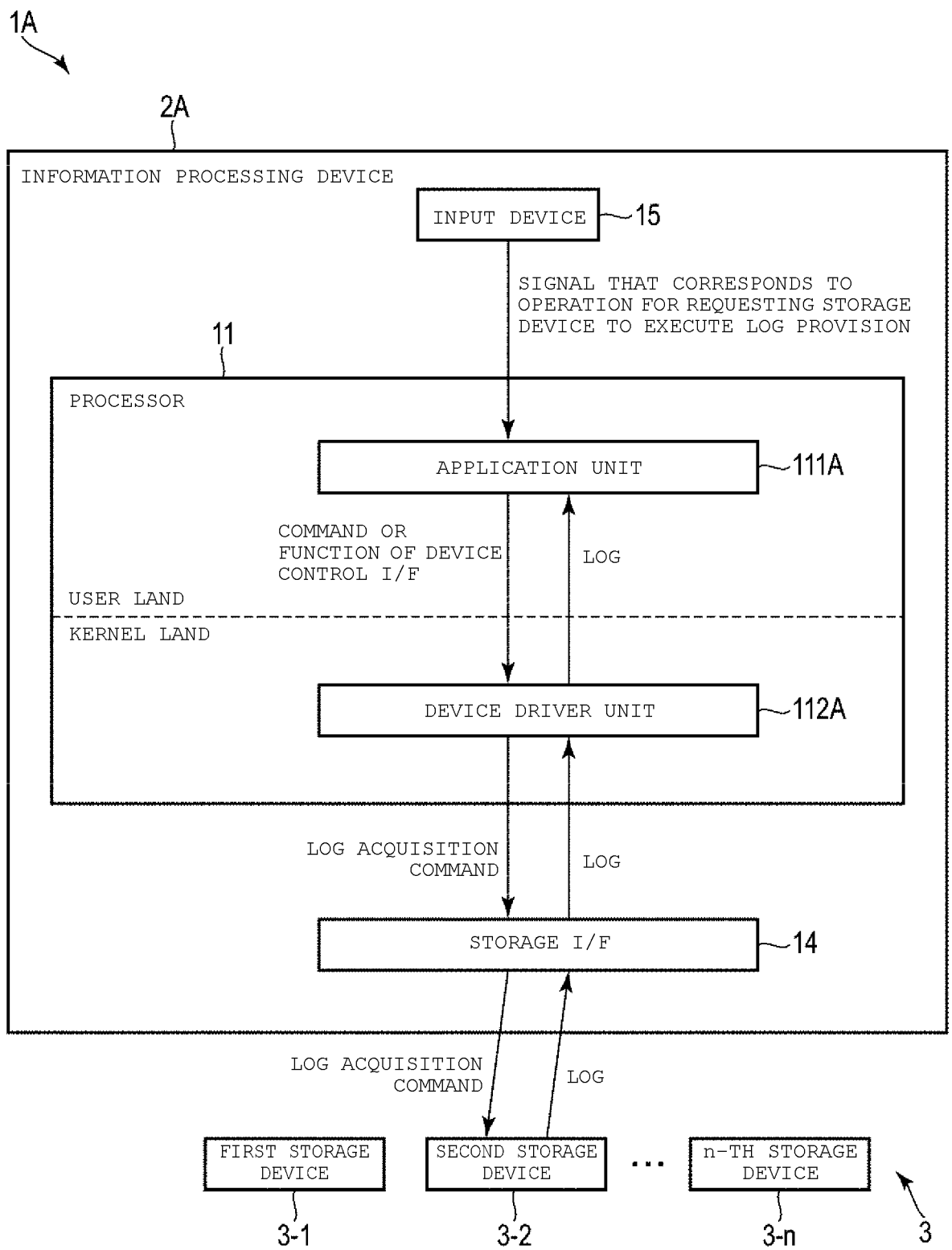
FIG. 8 is a diagram showing an example of an operation in which an information processing device causes a storage device to provide a log in an information processing system including the information processing device according to a comparative example.

FIG. 8 is a diagram showing an example of an operation in which an information processing device 2A causes a storage device 3 to provide a log in an information processing system LA including the information processing device 2A according to a comparative example. It is assumed that the information processing device 2A has the same hardware configuration as the information processing device 2 according to the first embodiment. The processor 11 of the information processing device 2A executes the OS 121 and the device driver 122. The functional configuration provided in the processor 11 of the information processing device 2A by executing the device driver 122 is referred to as a device driver unit 112A. Further, the processor 11 of the information processing device 2A executes an application program instead of the storage management application 123. In the following, the application program is also referred to as an application.

The application is a program for accessing the storage device 3 based on the signal of the input device 15 that corresponds to the operation by the administrator. The application is a program on the user land. The processor 11 executing the application receives a signal that corresponds to the operation by the administrator from the input device 15. The processor 11 executing the application executes the command or the function of the device control I/F 121A based on the received signal. In the following, the functional configuration provided in the processor 11 by executing the application is referred to as an application unit 111A.

The device driver unit 112 determines a command that corresponds to the command or the function executed by the application unit 111A. The device driver unit 112 issues the determined command. The device driver unit 112 transmits the issued command to one of the plurality of storage devices 3 via the storage I/F 14.

The storage device 3 receives the command transmitted by the device driver unit 112. The storage device 3 executes a process that corresponds to the received command.

As a more specific example, the operation by the administrator and the operation of the information processing system 1A when the storage device 3 is made to provide a log will be described below.

(1) The administrator performs an operation for checking the storage device 3 connected to the information processing device 2A. For example, the administrator performs an operation for requesting that the list of the storage device 3 that is connected to the information processing device 2A be displayed on the screen.

(2) The administrator determines one storage device 3 that is a target for providing a log. In the following, one storage device 3, which is a target for providing a log, is referred to as a target storage device 3. The administrator selects, for example, the target storage device 3 from the list. The administrator performs the operation for requesting the target storage device 3 to execute the log provision process by using the input device 15.

(3) The application unit 111A receives a signal that corresponds to the operation for requesting the target storage device 3 to execute the log provision process, from the input device 15. The application unit 111A executes the command or the function of the device control I/F 121A corresponding to the received signal. The target storage device 3 is designated in the command or the function to be executed. That is, by executing the command or function of the device control I/F 121A, the application unit 111A requests the device driver 122 to cause the target storage device 3 to execute the log provision process.

(4) The device driver unit 112A determines a corresponding command based on the executed command or function of the device control I/F 121A. The determined command is the log acquisition command. The device driver unit 112A issues the determined log acquisition command. Thereafter, the device driver unit 112A transmits the issued log acquisition command to the target storage device 3 via the storage I/F 14.

(5) The target storage device 3 receives the log acquisition command. The target storage device 3 provides the log to the information processing device 2A based on the received log acquisition command.

(6) The device driver unit 112A acquires the log provided by the target storage device 3. The device driver unit 112A transmits the acquired log to the application unit 111A.

(7) The application unit 111A receives the log of the target storage device 3 from the device driver unit 112A. The application unit 111A stores the received log as, for example, a file.

By the operations (1) and (2) by the administrator and the operations (3) to (7) in the information processing system 1A as described above, the information processing device 2A cause make the target storage device 3 to provide a log.

The operation by the administrator and the operation of the information processing system 1A when each of the plurality of storage devices 3 is made to provide a log, will be examined.

The device driver unit 112A transmits the log acquisition command to one target storage device 3 when the operation (2) is performed by the administrator (operation (4)). The log acquisition command supports, for example, one target storage device 3 to provide a log. Therefore, when causing each of the plurality of storage devices 3 to provide logs, the device driver unit 112A needs to transmit the log acquisition commands a number of times corresponding to the number of storage devices 3. Therefore, the administrator needs to perform the operation (2) a number of times corresponding to the number of storage devices 3.

The administrator performs the operation (2) a number of times corresponding to the number of storage devices 3 shown in the list by using the list of the storage device 3 acquired in the operation (1). As a result, the information processing device 2A can acquire the logs of all the storage devices 3 that are connected to the information processing device 2A. The administrator can check the necessary logs from all the acquired logs of the storage devices 3.

The administrator can also check the acquired log of one storage device 3 each time the operation (2) is performed. Further, when it is not necessary to acquire logs from all of the plurality of storage devices 3, the administrator may perform the operation (2) a number of times corresponding to at least one target storage device 3. As a result, the information processing device 2A does not have to acquire unnecessary logs provided by the non-target storage device 3.

However, when the operation (2) is performed a plurality of times, the risk of operation mistakes by the administrator increases. The administrator needs to perform the operation (2) for each of the plurality of storage devices 3. Specifically, the administrator performs the operation (2) for the first storage device 3-1, for example. The administrator waits until the first storage device 3-1 provides a log. After the first storage device 3-1 provided a log, the administrator further performs the operation (2) for the second storage device 3-2. In this way, the administrator needs to repeatedly perform the operation (2) for one storage device 3 and wait until the storage device 3 provides a log.

When the administrator does not wait after performing the operation (2) for one storage device 3, there is a possibility that an interval between the time when one storage device 3 provided a log and the time when the next one storage device 3 provided the log becomes long. The interval between the time when one storage device 3 provided a log and the time when the next one storage device 3 provided the log, is referred to as a log provision interval. When the log provision interval becomes long, a period required for all the storage devices 3 to provide logs becomes long.

Further, when the log provision interval becomes long, there is a high possibility that an access to the storage device 3 occurs during the log provision interval. Therefore, it can be said that the log of one storage device 3 and the log of another storage device 3 may be information collected under different conditions.

In order to make the condition for collecting logs constant, it is conceivable that the information processing device 2A temporarily suspends access to all the storage devices 3. For example, the information processing device 2A stops access for a time obtained by multiplying (the time required for the administrator to perform the operation (2) for one storage device 3 and the time required for the storage device 3 to provide a log after receiving the signal of the input device 15 corresponding to the operation by the number of storage devices 3. For example, when the information processing device 2A is a server computer of a data center, such an access stop has a great influence on a user who uses the data center.

Therefore, when the administrator performs the operation (2) on each of the plurality of storage devices 3, the risk of operation mistakes is increased and there is a possibility to increase the time required for all storage devices 3 to provide logs.

As described above, the information processing device 2A according to the comparative example causes the target storage device 3 to execute the process corresponding to the operation based on the signal of the input device 15 that corresponds to the operation (2) by the administrator.

Second Embodiment

In the first embodiment, an example is shown in which the information processing device 2 causes each of the plurality of storage devices 3 to provide logs. In contrast to this, in the second embodiment, an example in which the information processing device 2 causes each of the plurality of storage devices 3 to update the FW is shown.

The configuration of the information processing device 2 according to the second embodiment is the same as that of the information processing device 2 of the first embodiment, and the second embodiment and the first embodiment differ only in the configuration in which a command for updating the FW is transmitted to each of the plurality of storage devices 3. Hereinafter, the points different from the first embodiment will be mainly described.

The storage management unit 111 of the processor 11 has, for example, a function of causing each of the plurality of storage devices 3 to update the FW when the signal of the input device 15 corresponding to a specific operation by the administrator is received. The specific operation is an operation for requesting each of the plurality of storage devices 3 to update the FW. The operation for requesting each of the plurality of storage devices 3 to update the FW is referred to as an FW update request operation. The FW update request operation is an operation for requesting all the storage devices 3 to update the FW instead of any storage device 3 connected to the information processing device 2. Therefore, in the FW update request operation, the storage device 3 that is a target for updating the FW is not designated.

Figure 9:
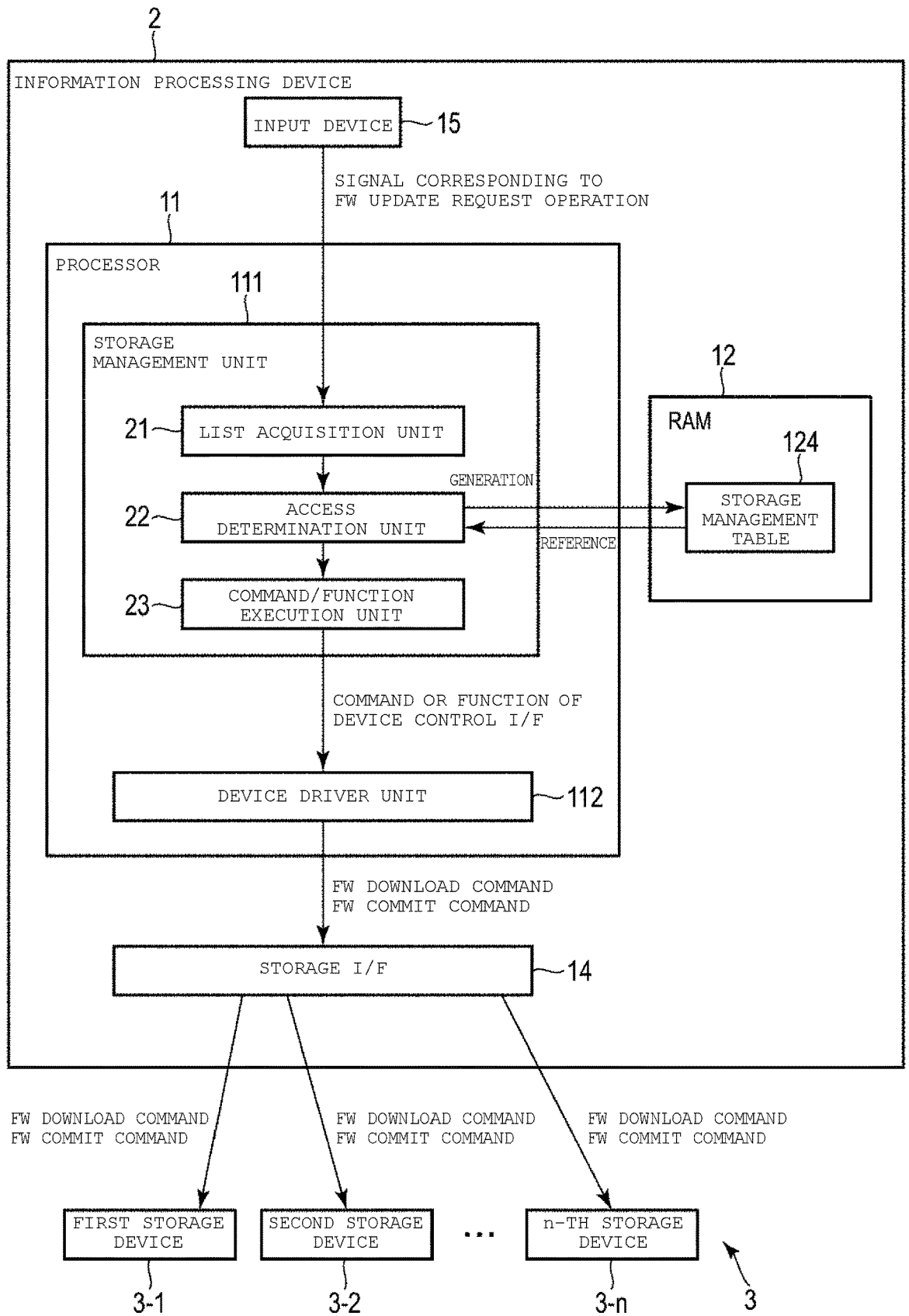
FIG. 9 is a diagram showing an example of a command transmission operation executed in an information processing device according to a second embodiment of the present disclosure.

FIG. 9 is a diagram showing an example of a command transmission operation executed in an information processing device 2 according to the second embodiment of the present disclosure. The operation of the information processing device 2 when the administrator performs the FW update request operation will be described below.

The list acquisition unit 21 of the storage management unit 111 receives a signal corresponding to the FW update request operation, from the input device 15. The list acquisition unit 21 acquires a list of the plurality of storage devices 3 that are connected to the information processing device 2 based on the received signal. The list acquisition unit 21 transmits the acquired list to the access determination unit 22.

The access determination unit 22 receives the list from the list acquisition unit 21. The access determination unit 22 generates the storage management table 124 by using the list. The storage management table 124 includes information for managing whether or not each of the plurality of storage devices 3 executed the process that corresponds to the FW update request operation. In the following, the process that corresponds to the FW update request operation is referred to as an FW update process. The FW update process is, for example, a process of downloading the FW and modifying the FW in the storage device 3 by using the downloaded FW.

The access determination unit 22 determines one storage device 3 that did not execute the FW update process by using the generated storage management table 124. The access determination unit 22 transmits an instruction, which indicates the determined one storage device 3, to the command/function execution unit 23. The access determination unit 22 repeatedly transmits instructions with respect to the command/function execution unit 23 until all the storage devices 3 complete the execution of the FW update process. By using the storage management table 124, the access determination unit 22 can cause all the storage devices 3 to execute the FW update process without omission.

More specifically, for example, the access determination unit 22 transmits an instruction indicating a first storage device 3-1 to the command/function execution unit 23. The access determination unit 22 transmits an instruction indicating a second storage device 3-2 to the command/function execution unit 23. Further, the access determination unit 22 transmits an instruction indicating an n-th storage device 3-n to the command/function execution unit 23.

The command/function execution unit 23 receives an instruction from the access determination unit 22. The command/function execution unit 23 executes one or more commands or functions of the device control I/F 121A corresponding to the FW update request operation based on the received instruction. The command/function execution unit 23 designates one storage device 3 that is indicated by the received instruction when one or more commands or functions of the device control I/F 121A are executed.

One or more commands to be executed are commands for downloading the FW and commands for modifying the FW. For example, one or more commands to be executed are the Firmware Image Download command and the Firmware Commit command of the ioctl in Linux.

Alternatively, one or more functions to be executed are, for example, functions for downloading the FW and modifying the FW. For example, one or more functions to be executed are functions of the API functions for FW download of the DeviceIoControl in Windows.

More specifically, for example, the command/function execution unit 23 designates the first storage device 3-1 and executes one or more commands or functions of the device control I/F 121A that corresponds to the FW update request operation. The command/function execution unit 23 designates the second storage device 3-2 and executes one or more commands or functions of the device control I/F 121A that corresponds to the FW update request operation. Thereafter, the command/function execution unit 23 designates the n-th storage device 3-n and executes one or more commands or functions of the device control I/F 121A that corresponds to the FW update request operation.

The device driver unit 112 determines a corresponding command based on the executed one or more commands or function of the device control I/F 121A corresponding to the FW update request operation. The determined command corresponds to the FW update process to be executed by the storage device 3.

Specifically, the device driver unit 112 determines the FW download command as a command to be issued when the Firmware Image Download command of the ioctl is executed. The FW download command is, for example, the Firmware Image Download command defined in the NVMe standard. The FW download command includes, for example, information indicating the storage location of the FW to be downloaded.

The device driver unit 112 determines the FW commit command as a command to be issued when the Firmware Commit command of the ioctl is executed. The FW commit command is, for example, the Firmware Commit command defined in the NVMe standard.

Further, the device driver unit 112 determines the FW download command and the FW commit command as commands to be issued when the API function for the FW download of the DeviceIoControl is executed.

The device driver unit 112 issues the determined command. Thereafter, the device driver unit 112 transmits the issued command to the designated storage device 3. The command is transmitted to the storage device 3 via the storage I/F 14. More specifically, for example, the device driver unit 112 transmits the FW download command and the FW commit command to the first storage device 3-1. The device driver unit 112 transmits the FW download command and the FW commit command to the second storage device 3-2. Further, the device driver unit 112 transmits the FW download command and the FW commit command to the n-th storage device 3-n.

Each of the plurality of storage devices 3 receives the FW download command and the FW commit command transmitted by the device driver unit 112. That is, the first storage device 3-1 receives the FW download command and FW commit command that are transmitted with respect to the first storage device 3-1. The second storage device 3-2 receives the FW download command and the FW commit command that are transmitted with respect to the second storage device 3-2. The n-th storage device 3-n receives the FW download command and the FW commit command that are transmitted with respect to the n-th storage device 3-n.

Figure 10:
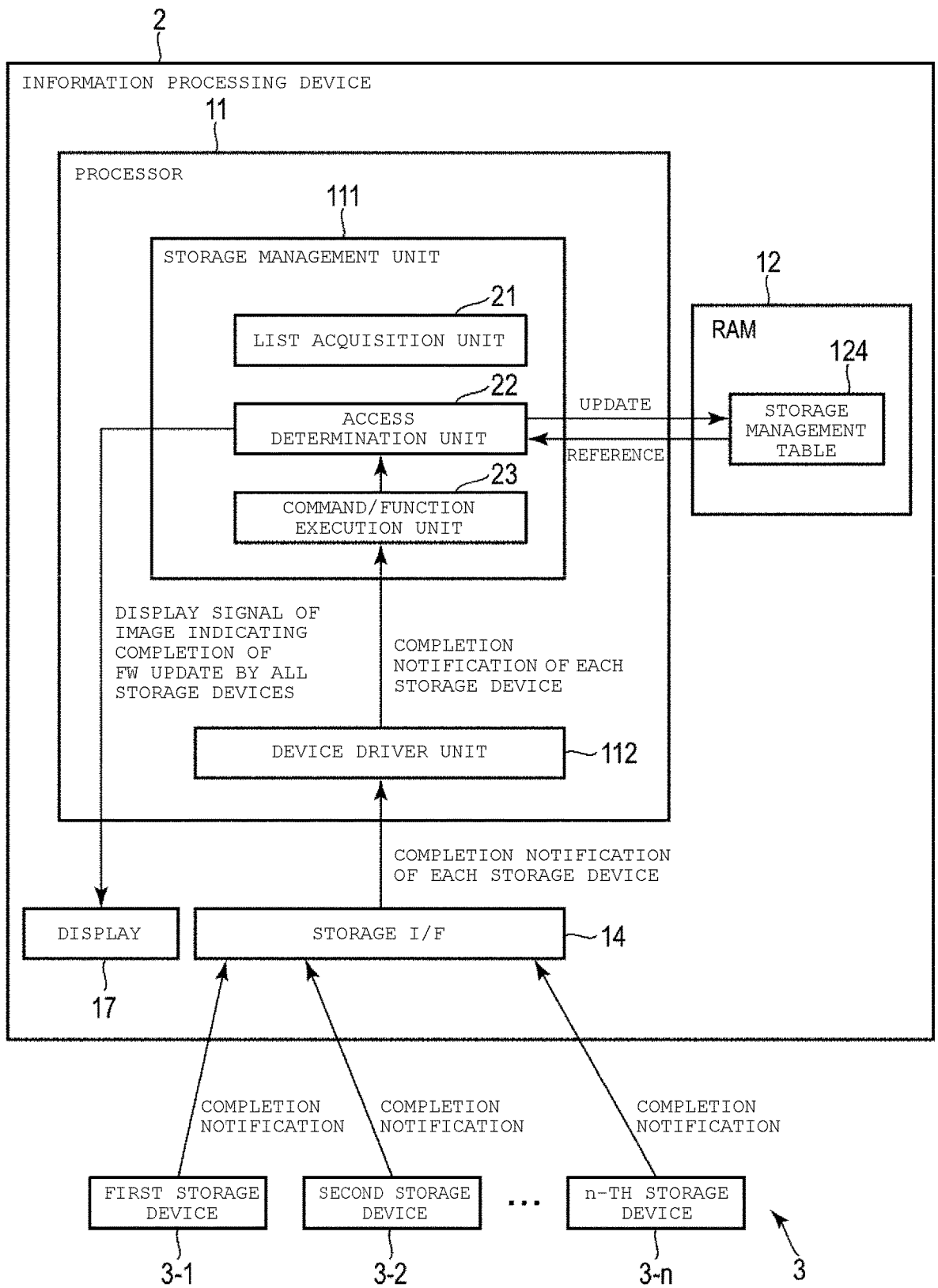
FIG. 10 is a diagram showing an example of a completion notification reception operation executed in the information processing device according to the second embodiment of the present disclosure.

FIG. 10 is a diagram showing an example of a completion notification reception operation executed in the information processing device 2 according to the first embodiment of the present disclosure. The operations of the storage device 3 and the information processing device 2 when storage device 3 downloads the FW based on the FW download command and modifies the FW based on the FW commit command, will be described below.

Each of the plurality of storage devices 3 downloads the FW based on the received FW download command. Each of the plurality of storage devices 3 modifies the FW in the storage device 3 by using the downloaded FW based on the received FW commit command. The storage device 3 can modify, for example, a failure of the FW by modifying the FW. Thereafter, each of the plurality of storage devices 3 downloads the FW, and when the FW is modified, notifies the information processing device 2 of the completion of the download and modification of the FW. That is, the first storage device 3-1 downloads the FW, and when the FW is modified, notifies the information processing device 2 of the completion of the download and modification of the FW.

The second storage device 3-2 downloads the FW, and when the FW is modified, notifies the information processing device 2 of the completion of the download and modification of the FW. The n-th storage device 3-n downloads the FW, and when the FW is modified, notifies the information processing device 2 of the completion of the download and modification of the FW.

The device driver unit 112 receives a notification indicating that each of the plurality of storage devices 3 completed downloading and modifying the FW. In the following, the notification indicating that the download and modification of the FW are completed is referred to as a completion notification. That is, the device driver unit 112 receives the completion notification from the first storage device 3-1. The device driver unit 112 receives the completion notification from the second storage device 3-2. The device driver unit 112 receives the completion notification from the n-th storage device 3-n. The device driver unit 112 transmits the received the completion notification for each storage device 3 to the command/function execution unit 23.

The command/function execution unit 23 receives the completion notification of one storage device 3 from the device driver unit 112. The command/function execution unit 23 notifies the access determination unit 22 of the fact that the completion notification is received from one storage device 3.

The access determination unit 22 updates the storage management table 124 when the command/function execution unit 23 notifies the access determination unit 22 of the fact that the completion notification is received from one storage device 3. Specifically, the access determination unit 22 specifies an entry that corresponds to the storage device 3 (that is, the storage device 3 whose FW is updated) that received the completion notification in the storage management table 124. Thereafter, the access determination unit 22 sets "completed" in the completed/incomplete field of the specified entry.

For example, when the command/function execution unit 23 notifies the access determination unit 22 of the fact that the completion notification is received from the first storage device 3-1, the access determination unit 22 specifies an entry that corresponds to the first storage device 3-1 in the storage management table 124. Thereafter, the access determination unit 22 sets "completed" in the completed/incomplete field of the specified entry. When the command/function execution unit 23 notifies the access determination unit 22 of the fact that the completion notification is received from the second storage device 3-2, the access determination unit 22 specifies an entry that corresponds to the second storage device 3-2 in the storage management table 124. Thereafter, the access determination unit 22 sets "completed" in the completed/incomplete field of the specified entry. When the command/function execution unit 23 notifies the access determination unit 22 of the fact that the completion notification is received from the n-th storage device 3-n, the access determination unit 22 specifies an entry that corresponds to the n-th storage device 3-n in the storage management table 124. Thereafter, the access determination unit 22 sets "completed" in the completed/incomplete field of the specified entry.

The access determination unit 22 determines whether or not all the storage devices 3 updated the FW by using the updated storage management table 124. The access determination unit 22 determines that all the storage devices 3 updated the FW when "completed" is set in the completed/incomplete field in all the entries in the storage management table 124. The access determination unit 22 determines that at least one storage device 3 did not update the FW when "incomplete" is set in the completed/incomplete field in at least one entry in the storage management table 124.

When all the storage devices 3 updated the FW, the access determination unit 22 may notify the administrator that all the storage devices 3 updated the FW. More specifically, the access determination unit 22 transmits, for example, a display signal of an image indicating the completion of the FW update by all the storage devices 3 to the display 17. The display 17 displays the image based on the display signal on the screen. Alternatively, the access determination unit 22 may transmit a voice signal of a voice that indicates the completion of the FW update by all the storage devices 3 to the speaker 18. The speaker 18 outputs the voice based on the voice signal.

When at least one storage device 3 did not update the FW, the access determination unit 22 transmits an instruction that indicates the storage device 3 that did not update the FW to the command/function execution unit 23. Subsequent operations of the command/function execution unit 23, the device driver unit 112, and the storage device 3 are as described above with reference to FIG. 9.

According to the configuration shown in FIGS. 9 and 10 above, the information processing device 2 can cause all the storage devices 3 to update the FW based on the signal of the input device 15 that corresponds to the one time FW update request operation by the administrator. The administrator does not need to perform an operation for requesting the FW update a number of times corresponding to the number of the plurality of storage devices 3. Therefore, the risk of operation mistakes by the administrator can be reduced. Further, as compared with the case where the administrator performs the operation a number of times corresponding to the number of the plurality of storage devices 3, the time required for all of the plurality of storage devices 3 to update the FW can be shortened. Therefore, the information processing device 2 can efficiently manage the plurality of storage devices 3.

Figure 11:
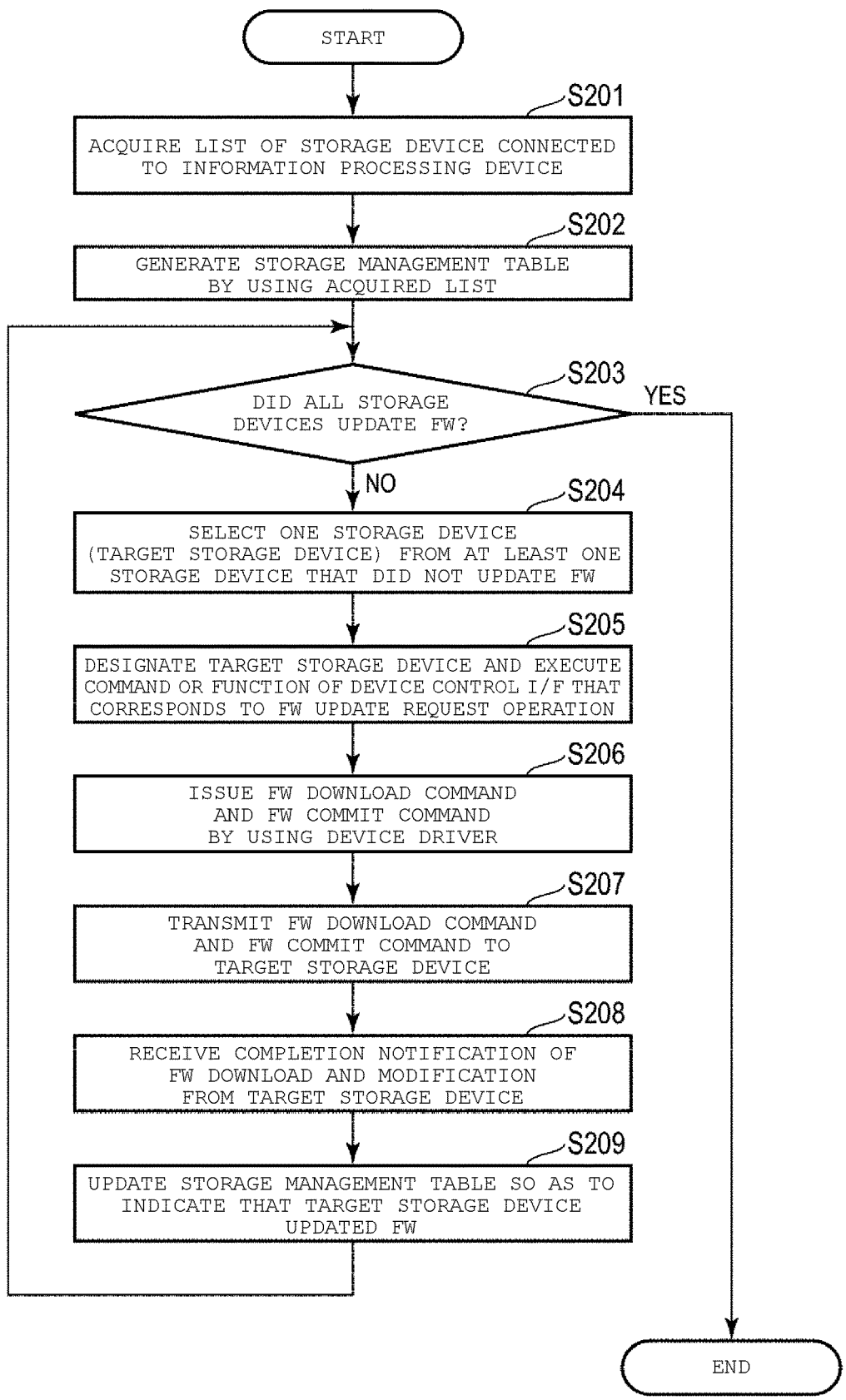
FIG. 11 is a flowchart showing an example of a procedure of an FW update process executed by a processor in the information processing device according to the second embodiment of the present disclosure.

FIG. 11 is a flowchart showing an example of a procedure of the FW update process executed by the processor 11 in the information processing device 2 according to the second embodiment of the present disclosure. The FW update process is a process for causing each of the plurality of storage devices 3 to update the FW. The processor 11 executes the FW update process based on the signal corresponding to the FW update request operation by the administrator received from the input device 15.

The procedure of S201 and S202 is the same as the procedure of S101 and S102 of the log acquisition process described above with reference to FIG. 7. That is, the processor 11 acquires the list of the storage device 3 connected to the information processing device 2 and generates the storage management table 124.

Next, the processor 11 determines whether or not all the storage devices 3 that are connected to the information processing device 2, updated the FW by using the storage management table 124 (S203). Specifically, when the storage management table 124 does not include an entry for which "incomplete" is set in the incomplete/completed field, the processor 11 determines that all the storage devices 3 updated the FW. When the storage management table 124 includes an entry for which "incomplete" is set in the incomplete/completed field, the processor 11 determines that at least one storage device 3 did not update the FW (that is, the processor 11 determines that there is a storage device 3 that did not update the FW).

When all the storage devices 3 updated the FW (YES in S203), the processor 11 ends the FW update process (end).

When at least one storage device 3 did not update the FW (NO in S203), the processor 11 selects one storage device 3 from at least one storage device 3 that did not update the FW (S204). The selected one storage device 3 is referred to as a target storage device 3.

The processor 11 designates the target storage device 3 and executes the command or the function of the device control I/F 121A that corresponds to the FW update request operation (S205). Thereafter, the processor 11 issues the FW download command or the FW commit command by using the device driver 122 based on the executed command or function of the device control I/F 121A (S206). The processor 11 transmits the issued FW download command and FW commit command to the target storage device 3 via the storage I/F 14 (S207).

The target storage device 3 receives the FW download command. The target storage device 3 downloads the FW based on the received FW download command. The target storage device 3 receives the FW commit command. The target storage device 3 modifies the FW in the target storage device 3 by using the downloaded FW based on the received FW commit command. Thereafter, the target storage device 3 notifies the information processing device 2 of the completion of the download and modification of the FW.

The processor 11 receives a notification indicating that the download and modification of the FW are completed, from the target storage device 3 (S208). The processor 11 updates the storage management table 124 (S209) so as to indicate that the target storage device 3 updated the FW, and proceeds to S203. That is, the processor 11 repeats the procedure from S204 to S209 for causing one storage device 3 to update the FW until all the storage devices 3 update the FW.

By the FW update process shown in FIG. 11 above, the processor 11 can cause all the storage devices 3 that are connected to the information processing device 2 to update the FW. The processor 11 can cause all the storage devices 3 to update the FW only by the administrator performing the one time FW update request operation.

As described above, according to the first and second embodiments, the plurality of storage devices 3 can be efficiently managed. The processor 11 receives a signal that corresponds to one time operation (for example, the log provision request operation, the FW update request operation) for requesting each of the plurality of storage devices 3 to execute the first process, from the input device 15. The processor 11 transmits a command that corresponds to the first process (for example, the log acquisition command, the FW download command, or the FW commit command) to each of the plurality of storage devices 3 based on the received signal by using the plurality of identifiers (storage IDs) indicating each of the plurality of storage devices 3.

As a result, the information processing device 2 can cause all the connected storage devices 3 to execute the process corresponding to the operation based on the signal of the input device 15 that corresponds to the one time operation by the administrator. The administrator does not need to perform the operation a number of times corresponding to the number of the plurality of storage devices 3. Therefore, the risk of operation mistakes by the administrator can be reduced. Further, as compared with the case where the administrator performs the operation a number of times corresponding to the number of the plurality of storage devices 3, the time required for all of the plurality of storage devices 3 to complete the execution of the process corresponding to the operation can be shortened. Therefore, the information processing device 2 can efficiently manage the plurality of storage devices 3.

It is noted that the process, in which the information processing device 2 causes each of the plurality of storage devices 3 to execute based on the signal of the input device 15 corresponding to one time operation by the administrator, is not limited to the log provision process and the FW update process. The process, in which the information processing device 2 causes each of the plurality of storage devices 3 to execute, includes, for example, a process of creating a namespace and a process of connecting (attaching) the namespace to a controller in the storage device 3.

Each of the various functions described in the first and second embodiments may be implemented by a circuit (processing circuit). Examples of processing circuits include programmed processors such as central processing units (CPUs). This processor executes each of the described functions by executing a computer program (instruction group) stored in the memory. This processor may be a microprocessor including an electric circuit. Examples of processing circuits also include digital signal processors (DSPs), application specific integrated circuits (ASICs), microcontrollers, controllers, and other electric circuit components. Each of the components other than the CPU described in the present embodiment may also be implemented by a processing circuit.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An information processing device comprising:
   a processor,
   wherein the processor is configured to:
      receive a signal for requesting each of a plurality of storage devices to execute a first process;
      execute a first command or a function, corresponding to the signal, using a device control interface provided in an operating system being executed; and
      transmit a second command, corresponding to the first process, to each of the plurality of storage devices using a plurality of identifiers relating to the plurality of storage devices, respectively, and using a device driver configured for controlling the plurality of storage devices based on the executed first command or function.

2. The information processing device according to claim 1,
   wherein the processor is further configured to:
      upon receiving the signal, acquire a list of the plurality of storage devices including the plurality of identifiers;
      by the list, generate a table for managing whether or not the plurality of storage devices executed the first process, and
      transmit the second command to each of the plurality of storage devices based on the list and the table.

3. The information processing device according to claim 1,
   wherein the first process corresponds to provision of a log.

4. The information processing device according to claim 3,
   wherein the processor is further configured to:
      upon receiving the signal, generate information including the plurality of identifiers; and
      manage whether or not each of the plurality of storage devices has provided the log based on the information.

5. The information processing device according to claim 1,
   wherein the first process corresponds to update of firmware.

6. The information processing device according to claim 5,
   wherein the processor is further configured to:
      upon receiving the signal, generate information including the plurality of identifiers; and
      manage whether or not each of the plurality of storage devices has updated the firmware based on the information.

7. A control method of an information processing device comprising:
   receiving, by a processor, a signal for requesting each of a plurality of storage devices to execute a first process;
   executing a first command or a function, corresponding to the signal, using a device control interface provided in an operating system being executed;
   transmitting a second command, corresponding to the first process, to each of the plurality of storage devices using a plurality of identifiers relating to the plurality of storage devices, respectively; and
   controlling, using a device driver, the plurality of storage devices based on the executed first command or function.

8. The control method according to claim 7, further comprising:
   executing a second command or a function, corresponding to the signal, using the device control interface provided in the operating system being executed; and
   transmitting the first command to each of the plurality of storage devices using the device driver based on the executed second command or function.

9. The control method according to claim 7, wherein the first process corresponds to provision of a log.

10. The control method according to claim 9, further comprising:
    upon receiving the signal, generating information including the plurality of identifiers; and
    managing whether or not each of the plurality of storage devices has provided the log based on the information.

11. The control method according to claim 7, wherein the first process corresponds to update of firmware.

12. The control method according to claim 11, further comprising:
    upon receiving a signal, generating information including the plurality of identifiers; and
    managing whether or not each of the plurality of storage devices has updated the firmware based on the information.

13. A system comprising:
    an information processing device; and
    a plurality of storage devices,
    wherein the information processing device is configured to:
       receive a signal for requesting each of the plurality of storage devices to execute a first process, execute a first command or a function, corresponding to the signal, using a device control interface provided in an operating system being executed; and transmit a second command, corresponding to the first process, to each of the plurality of storage devices using a plurality of identifiers relating to the plurality of storage devices, respectively, and using a device driver configured for controlling the plurality of storage devices based on the executed first command or function, wherein each of the plurality of storage devices is configured to execute the first process based on the first command.

14. The system according to claim 13, wherein the first process corresponds to provision of a log.

15. The system according to claim 13, wherein the first process corresponds to update of firmware.

* * * * *